(12) United States Patent
Melland

(10) Patent No.: US 6,581,346 B2
(45) Date of Patent: Jun. 24, 2003

(54) METAL FASTENER FOR BONDING CONCRETE TO FLOORS

(76) Inventor: Robert C. Melland, 4172 S. Olive St., Denver, CO (US) 80237

( * ) Notice: Subject to any disclaimer, the term of this patent is extended or adjusted under 35 U.S.C. 154(b) by 0 days.

(21) Appl. No.: 09/815,086

(22) Filed: Mar. 21, 2001

(65) Prior Publication Data
US 2002/0174621 A1 Nov. 28, 2002

(51) Int. Cl.$^7$ .................................................. E04B 5/36
(52) U.S. Cl. ......................................... 52/335; 52/334
(58) Field of Search ......................... 52/334, DIG. 6, 52/712, 335; 411/466, 467, 468, 921

(56) References Cited

U.S. PATENT DOCUMENTS

| | | | | |
|---|---|---|---|---|
| 619,769 A | * | 2/1899 | Lilienthal | 52/335 |
| 1,885,883 A | * | 11/1932 | Young | 52/334 |
| 1,929,478 A | * | 10/1933 | Bunker | 52/335 |
| 1,947,418 A | * | 2/1934 | Kahn | 52/335 |
| 2,325,766 A | * | 8/1943 | Gisondi | 52/DIG. 6 |
| 2,339,841 A | * | 1/1944 | Deuchler et al. | 52/DIG. 6 |
| 2,937,418 A | * | 5/1960 | Sandord | 411/466 |
| 3,177,619 A | * | 4/1965 | Benjamin | 52/334 |
| 3,245,186 A | * | 4/1966 | Jentoft | 52/334 |
| 5,561,957 A | * | 10/1996 | Gauthier | 52/334 |
| 6,171,043 B1 | * | 1/2001 | Williams | 52/712 |

FOREIGN PATENT DOCUMENTS

DE 2650181 * 8/1977 ............. 52/DIG. 6

* cited by examiner

Primary Examiner—Michael Safavi
(74) Attorney, Agent, or Firm—Ramon L. Pizarro; Edwin H. Crabtree

(57) ABSTRACT

Thin metal anchoring plates provide mechanical bonding between flooring materials such as concrete and plywood. Teeth punched from the metal plates and bent at right angles on the topside form anchorage for the concrete slab and metal screws anchor the metal plate to the plywood subfloor. The metal anchoring plates allow a thin layer of concrete to form a composite section with residential floor construction and to stay in compression—a state in which cracking cannot occur in concrete. Thus, two inherent problems associated with concrete—it's heavy weight and propensity for cracking are solved and thus, allow it now to be used for residential seamless flooring that can be colored, stamped, and textured, for years of low maintenance fire resistant use.

3 Claims, 1 Drawing Sheet

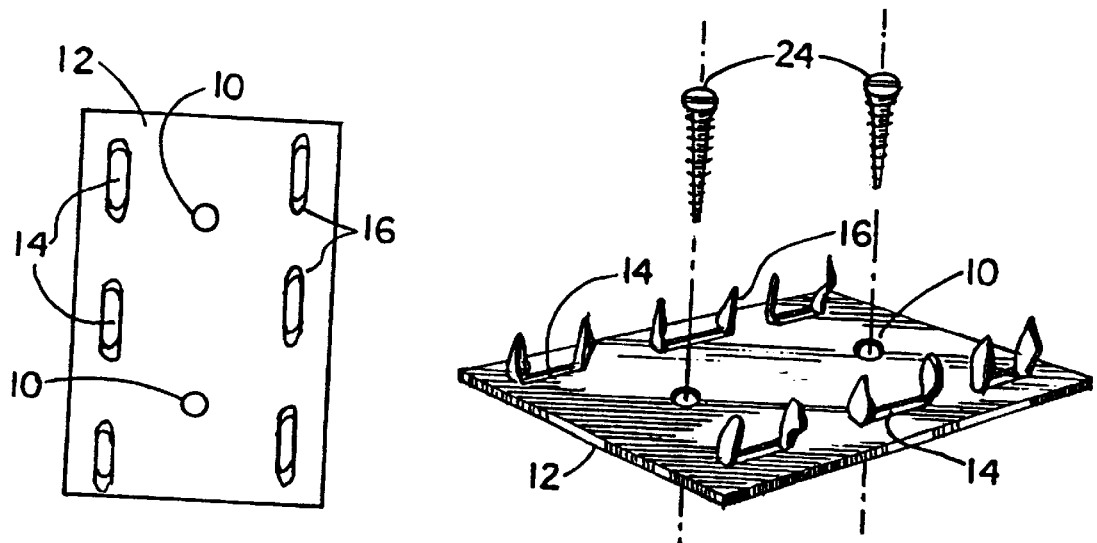
FIG. 1
FIG. 2
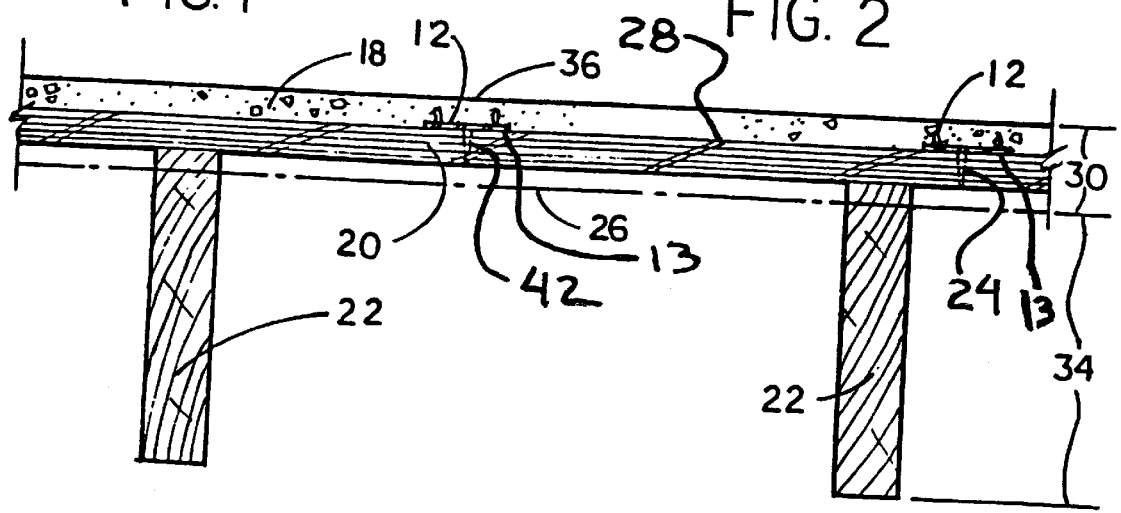
FIG. 3
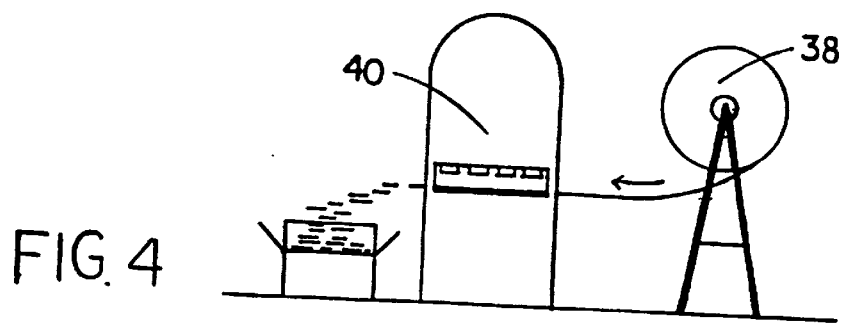
FIG. 4 under the influence of a load. Wire mesh and reinforcement bars were generally embedded in the wet concrete to impart strength in resisting bending, cracking, and puncture stresses.
METAL FASTENER FOR BONDING CONCRETE TO FLOORS

CROSS-REFERENCE TO RELATED APPLICATIONS

Not Applicable.

BACKGROUND—FIELD OF INVENTION

This invention relates to metal fasteners, specifically to metal fasteners that are used to bond flooring materials together.

BACKGROUND—DESCRIPTION OF PRIOR ART

Traditionally, when cast-in-place concrete was used with a wood floor in non-residential construction, the structure was often designed as a composite construction to reduce the size of the members. In this type of construction both materials (concrete and wood) were designed to act in unison due to the bond between them. Composite action was generally achieved between the concrete slab and the supporting wood beams independent of the wood sheathing between the beams. This action was typically accomplished with some form of "shear studs" such as nails, steel rods, metal plates bolts, pipes, and the like. The shear studs engaged both materials and acted to resist the sliding of the slab with respect to the beams when the unit was deformed under the influence of a load. Wire mesh and reinforcement bars were generally embedded in the wet concrete to impart strength in resisting bending, cracking, and puncture stresses.

In light frame residential construction the process of casting concrete onto wood floors was generally done without the task of attaching some type of shear studs to the floor joists. Concrete was simply poured onto pre-positioned metal reinforcement placed on the floor sheathing and screeded to a depth that provided cover for the steel reinforcement—usually 1.5" to 3". Pouring seamless floors were avoided because of the cracking that resulted from shrinkage as the concrete cured. Cracking was controlled by the use of expansion and control joints but often these joints filled with dirt and over time took away from the appearance of the floors.

Concrete was a very heavy material and the added weight to a residential floor was considerable. Often a concrete slab added as much as 30 to 40 lb. per sq. ft. of dead load. Most residential floors were designed to carry only 10 to 15 lb. per sq. ft. of dead load. Thus, many contractors and homeowners were reluctant to spend the extra money to build or add the necessary supporting structure to carry the extra weight. Concrete was also a very brittle material that cracked easily under small deflections. Such deflections were common in light frame residential construction and became more so as the structure aged and the wood members shrank.

Whatever flooring system is evolved in residential construction to utilize concrete's beneficial properties (fire resistance; freedom from allergies; low maintenance; colorability; low installed costs, etc.) must out of necessity reduce the weight of the concrete floor so no additional support is required and, eliminate the inherent cracking caused from shrinkage and deflection of the concrete.

Thereafter, inventors created several types of concrete floor and wood constructions in which shear resisting elements were used to achieve composite action. U.S. Pat. No. 4,841,703 to Grimaud (1989) discloses a complex assembly of parts which appear to produce a concrete and wood floor composite using a metal tube as a shear resistor. However, these tubes only resist shear at the points they are driven into the wood beam. The sheathing material between the beams lacks any composite action with other materials and as the inventor states, "can be removed". In an article by Godychi et al entitled "Verbunddecke aus Holzrippen unde Betonplatte" (Bauinggenieur 59 (1984) 477–483, Springer-Verlag, West Germany, describes a concrete floor in which steel nails are partially driven into the wood joists leaving the upper part of the nails and heads to engage the concrete floor. While these nails were confined only to the beams and not to the sheathing, they suffer from bending in their middle and bottom lengths that would be produced by the effects of the horizontal shear forces mentioned above.

In another floor, sheet metal connector plates with integral connecting teeth were attached to both sides of the wood beam. The top portion of each plate projected above the beam and was cut to form a series of pointed connection teeth which pass through the floor sheathing when the latter is put into place between the beams. These teeth subsequently become embedded into the concrete slab. One such floor is mentioned without being described in detail in European patent EPAL-0104629 Poutanen, Tuomo Tapini). While this floor had a advantage over those previously mentioned in that the connection is very rigid in resisting the horizontal shear stresses mentioned above, it does suffer from the following drawbacks:

(1) The attachment of the plates to the vertical sides of the beam would require a press to be used which must be capable of exerting considerable force. If this process was performed off-site, storage and handling of these beams would become difficult because of the poor stiffness of the connection teeth and the plates in the transverse direction. If the process was performed on-site, bringing such a large press into contact with the beams would be very difficult.

(2) Piercing the wood sheathing with connecting teeth from the metal plates would prove to be hard to do. Furthermore, if the sheathing was anchored to the floor beams first, then the sheathing would prevent the upper part of the plates from engaging the concrete.

SUMMARY

In accordance with the present invention a metal fastener comprising a flat plate, projecting teeth punched therefrom and bent at right angles to the top side of the plate for engaging concrete, and means for anchoring said plate to a floor substrate.

OBJECTS AND ADVANTAGES

Accordingly, besides the objects and advantages of the metal fastener described in my above patent, several objects and advantages of the patent are:

(a) to provide a fastener that can uniformly provide composite action over the entire floor between the concrete and wood without regard to the location of the supporting floor joists;

(b) to provide a fastener that will eliminate floor cracking;

(c) to provide a floor fastener that can rapidly be attached to a penetrable floor substrate by unskilled workmen;

(d) to provide a fastener that would allow the surface of the concrete to be colored or stained and later stamped with various patterns and textures of the user's choice.

(e) to provide a fastener whose use will allow a thin layer of concrete to be placed on a new or existing floor that does not require extra structural support;

(f) to provide a fastener that will allow a fire rated floor assembly to be produced which will protect occupants of the building against smoke and fire;

(g) to provide a fastener that will produce beautiful low cost floors that will have wide acceptance in all sectors of residential and commercial construction;

(h) to provide a fastener that will allow radiant heating elements to be installed onto the floor substrate and then covered with a seamless concrete floor to provide heating for the home;

(i) to provide a fastener that will produce seamless, crack free floors without the need for expansion joints and control joints.

Further objects and advantages are to provide a fastener which can be used to produce thin concrete floors for use outside of buildings to cover existing and new floors of balconies, roofs, decks, terraces, patios, and the like, to produce attractive, long wearing, low maintenance flooring that can be supported without additional structural costs. Still further objects and advantages will become apparent from the consideration of the ensuing description and drawings.

DRAWING FIGURES

FIG. 1 shows a plan view of the metal fastener supplied with teeth and holes for anchorage.

FIG. 2 shows a perspective view of the metal fastener in which the punched out teeth can be seen in a bent position at right angles to the top of the plate, and screws positioned in the holes to secure the plate to a floor substrate.

FIG. 3 shows a cross-sectional view of a typical residential wood floor in which a wood joist is supporting a plywood subfloor onto which a thin layer of concrete has been poured and secured with metal fasteners anchored to the plywood subfloor.

FIG. 4 shows a simplified manufacturing process of how the metal fasteners are produced.

REFERENCE NUMERALS IN DRAWINGS 10 hole
12 flat metal plate
14 void space in plate
16 bent tooth perpendicular to top of plate
18 thin layer of concrete
20 plywood subfloor
22 wood floor joist
24 metal screw
26 neutral axis of combined materials
28 flexible plastic vapor barrier
30 composite area in compression
34 composite area in tension
36 surface of concrete floor
38 feed coil of sheet metal
40 stamping and cutting press
42 sheet metal fasteners

DESCRIPTION—FIGS. 1–4

FIGS. 1–2 is a plan view and perspective constructed in accordance with the invention. A flat metal plate 12 containing teeth 16 punched out and bent at right angles to the top of the plate 12 leaving voids 14 in the plate 12. The projecting teeth are repeated on both sides of the plate. Hole 10 is drilled into the plate for placement of metal screw 24 to provide anchorage of the plate 12 to the wood substrate 20.

FIG. 3 is a cross-sectional view of a typical wood residential floor showing a wood floor joist 22 supporting a plywood subfloor 20 and a thin layer of concrete 18 both of which are separated by a flexible plastic vapor barrier 28. On top of the plastic vapor barrier 28 are located flat metal plates 12 spaced apart from each other and anchored to the plywood subfloor 20 with metal screws 24. The thin layer of concrete 18 is shown as being cast onto the metal plate 12 and engaging said teeth 16 being an integral part of plate 12. The neutral axis 26 being a property of the composite section shown in FIG. 3 is approximately the distance 30 down from the top of the concrete slab 34 and above the bottom of the wood floor joist 22 an approximate distance 32. The distance 30 representing that portion of the composite section in compression and the distance 32 representing that portion of the composite section in tension.

ADVANTAGES

From the description above, a number of advantages of my metal fasteners become evident:

(a) A few boxes of metal fasteners will contain enough anchors to pour new concrete floors in a typical residence, will obviate the need for expensive reinforcement bars to be embedded in concrete and the labor to install same, and will substantially speed up the process of work to complete the job of installing the floors.

(b) The fasteners allow thin layers of concrete to go into compression easier than thick sections. Thus, the thinner the concrete slab, the stronger the concrete becomes.

(c) The fasteners, in producing thinner concrete floors, dramatically reduce the weight on the floors, thus, obviating the need for costly extra support for thicker floors.

OPERATION—FIGS 1, 2, 3, 4

In operation one spreads a plastic vapor barrier sheet 28 to cover the floor to receive concrete. The lower side 13 of the plate 12 is placed over the subfloor 20. Metal fasteners 12 are anchored to the plywood subfloor 20 at spaced intervals apart from each other with metal screws 24 through the vapor barrier. wet concrete is then poured onto the vapor barrier 28 and engaging the teeth 16 of each metal fastener. The concrete is screeded to an approximate depth of ¾" in thickness. After waiting until a sufficient amount of bleed water is evaporated from the surface of the concrete, stamping subcontractors color and texture the surface of the concrete according to specifications. Upon curing, the concrete surface is then cleaned and receives a final sealer coat. The floor is then ready to be put into service once the sealer hardens.

CONCLUSIONS, RAMIFICATIONS, AND SCOPE

Accordingly, the reader will see that concrete, a very noble but heavy building material, has been used over the years in construction generally to it's best advantage, that is, when it is in compression such as in foundations and footings. Concrete is very strong in compression and it is virtually impossible for it to crack as long as it stays in the compressive state. This invention shows for the first time concrete can be used in very thin sheets and still remain in compression and thus, avoid the costly penalty of supporting it's heavy weight by additional structure while at the same time eliminating one of concrete's worst problems— cracking.

Hard surface decorative floors are new to the residential market in the U.S. but not to the rest of the world. Many countries have traditionally had such floors for centuries in their homes in the form of marbles, tiles, stone, and slate. With the advent of petroleum shortages in the near future from whence most all floor coverings are made such as nylon and olefin, and the high incidence of allergies now being attributed to indoor carpeting, it appears concrete has a very important niche to fill in the domestic flooring market.

Although the description above contains specificities, these should not be construed as limiting the scope of the invention but as merely providing illustrations of some of the preferred embodiments of this invention. For example, the metal fastener can have other shapes, such as circular, oval, trapezoidal, triangular, elongated, etc.

Thus the scope of the invention should be determined by the appended claims and their legal equivalents, rather than by the examples given.

I claim:

1. A concrete floor comprising:

a generally horizontal, wooden subfloor that is supported by wooden floor joists;

a shear force transfer connector comprising:

a plate having a top side and a lower side, the top side having a plurality of teeth protruding from the top side the lower side of said shear force transfer connector being fastened against the wooden subfloor; and a layer of concrete mix over the subfloor and the shear force transfer connector, the concrete mix covering the teeth of the shear force transfer connector.

2. A floor according to claim 1 wherein said wooden subfloor is fastened to said wooden floor joists and said shear force transfer connector is fastened to said wooden subfloor.

3. A floor according to claim 1 wherein said layer of concrete mix is cured directly over said shear force transfer connector and said subfloor.

* * * * *